May 12, 1942.   A. F. HENNINGER ET AL   2,282,582
MOTOR
Filed Nov. 12, 1940   3 Sheets-Sheet 1

Inventors:
Andrew F. Henninger
George D. Henninger
By: Bair Carlson Stilbaugh & Wells
Attys May 12, 1942.  A. F. HENNINGER ET AL  2,282,582
MOTOR
Filed Nov. 12, 1940   3 Sheets-Sheet 2

Inventors:
Andrew F. Henninger
George D. Henninger

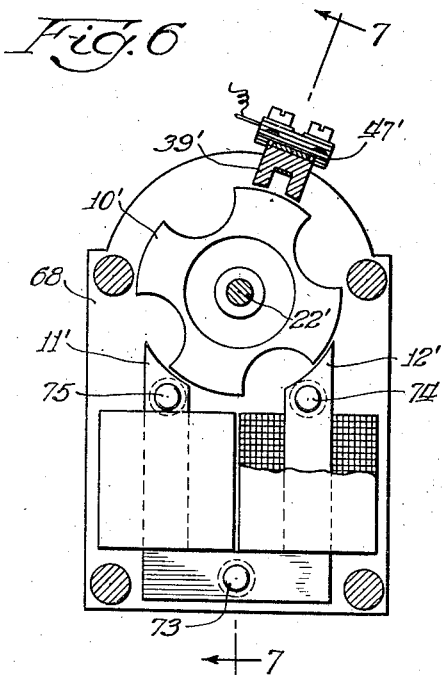
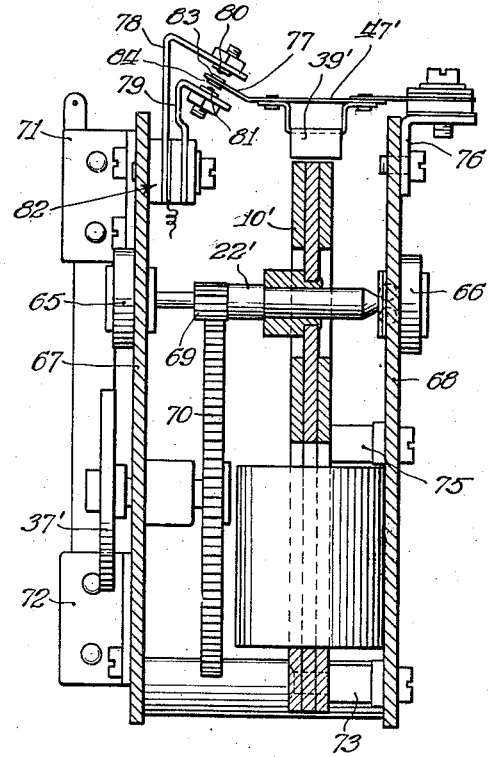
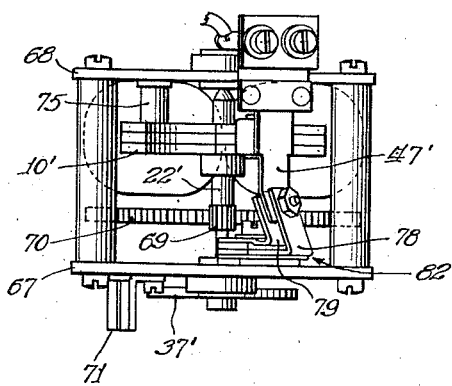

Patented May 12, 1942

2,282,582

UNITED STATES PATENT OFFICE 2,282,582

MOTOR

Andrew F. Henninger and George D. Henninger, Chicago, Ill.

Application November 12, 1940, Serial No. 365,242

8 Claims. (Cl. 172—36)

This invention relates to electric motors and is particularly directed to a combination, direct current motor, timer and interrupter.

The invention is adapted to be embodied in an operating unit for gaseous conduction lamps such as that shown in our Patent No. 2,217,315. When such lamps are used as traffic signals, stop signs, marine beacons, aviation lights, railway signals, etc. it is necessary, in many cases, to depend upon a battery as the power source to operate the light and to operate the mechanism by which the light is flashed on and off. Under such circumstances it is essential to economize in the use of power because of the need to obtain a long life from a battery and the need to avoid frequent servicing of the unit.

One purpose of the present invention, therefore, is to provide a combination, direct current motor, timer and interrupter of high efficiency which is also capable of operating at a substantially uniform rate of speed over a wide range of applied voltage from the battery source. It is a characteristic of dry batteries that the voltage drops substantially as the battery is exhausted.

It is a further purpose of the present invention to provide a unit of the character above referred to in which self-starting of the motor is simply and easily obtained and which avoids entirely the use of commutators or other undesirable points of friction that cannot be properly lubricated without impairing the electrical contact.

Other and more detailed objects and advantages of the present invention will appear as the description proceeds in connection with the accompanying drawings. It is to be understood however that the drawings and description are illustrative only and are not to be taken as limiting the invention, except insofar as it is limited by the claims.

In the drawings:

Fig. 6 is a longitudinal sectional view through a modified form of the invention;

Fig. 7 is a sectional view taken on the line 7—7 of Fig. 6; and

Fig. 8 is a plan view of the device shown in Figs. 6 and 7.

Figure 1:
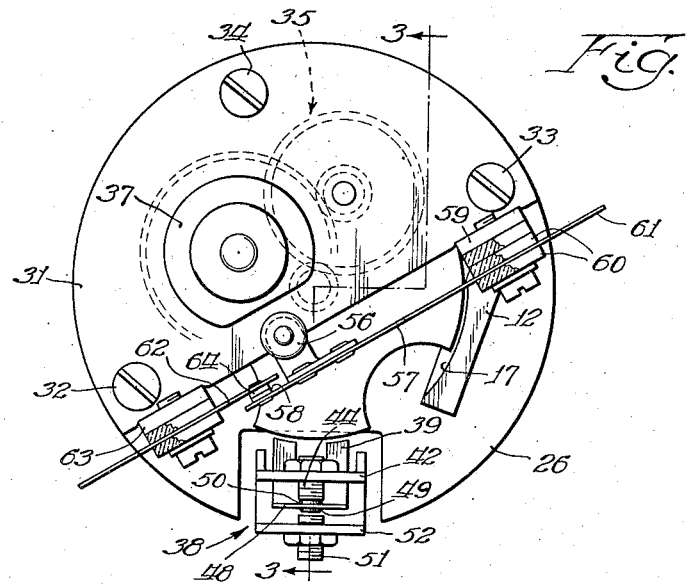
Fig. 1 is a plan view of a motor, interrupter and timing device embodying the invention.
Figure 2:
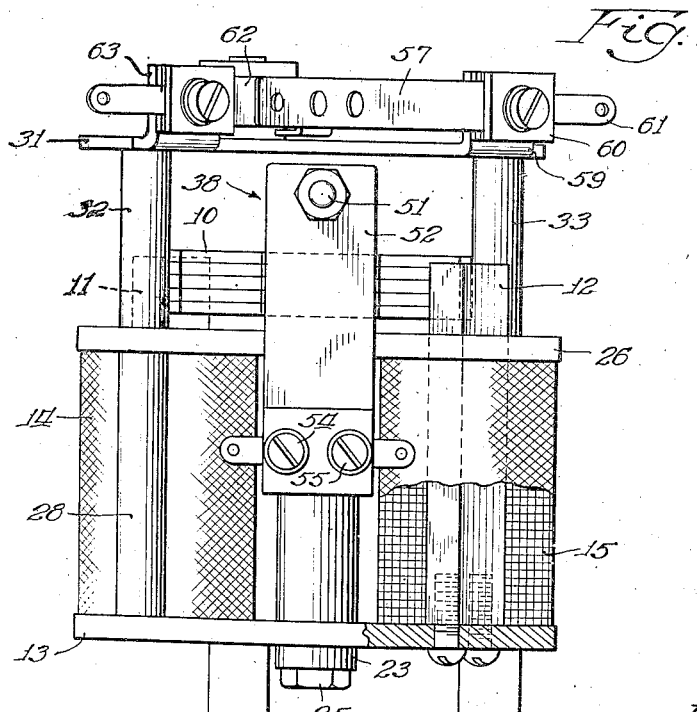
Fig. 2 is a view in side elevation of the device shown in Fig. 1.

Referring now in detail to the drawings and to the form of device shown in Figs. 1 to 4, inclusive, the device includes a motor comprising a rotor 10 of soft magnet iron, two field poles 11 and 12 also of soft magnetic iron, and a connecting frame piece 13 of the same material as the poles 11 and 12. Two field coils 14 and 15 are wound on the poles 11 and 12 and are adapted to be energized in a manner that will be presently explained. The coils 14 and 15 are so wound that when energized one of the poles 11 adjacent the rotor is positive while the opposite pole 12 is negative. As shown best in Fig. 4, the upper ends of the poles 11 and 12 are provided with notches 16 and 17, respectively, which notches are cut to conform to and fit closely upon the path of rotation of the rotor 10.

Figure 3:
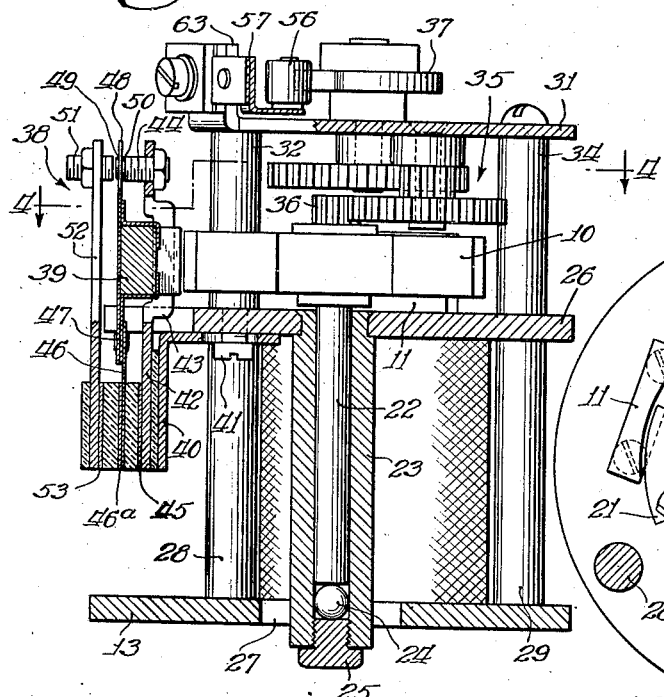
Fig. 3 is a sectional view taken substantially on the line 3—3 of Fig. 2.

The rotor 10 as shown is made up of a plurality of laminations which are cut to provide four poles 18, 19, 20 and 21, the laminations being hollowed out between the poles. This rotor is carried by a shaft 22 which extends down into an oil-filled receptacle 23 and is supported upon a ball 24, the ball 24 being adjustable within the receptacle 23 by means of a screw 25 as shown in Fig. 3. This makes it possible to correctly position the rotor 10 with respect to the notches 16 and 17 in the poles 11 and 12.

The receptacle 23 is suspended from a plate 26 which is of non-magnetic material, such for example as brass, and through which the poles 11 and 12 extend. The plate 13 which is of magnetic material has an opening 27 therein through which the receptacle 24 extends. It will be evident from the foregoing description of the mounting of the rotor 10 that it is accurately positioned with respect to the poles 11 and 12 and is free from any binding strain in its bearings due to the fact that all of the positioning and securing is made through the single plate 26.

The plate 26 is spaced from the plate 13 by a plurality of posts 28, 29 and 30. The plate 26 supports another plate 31 substantially semi-circular in shape, there being three posts 32, 33 and 34 provided for this purpose. The function of the plate 31 is to support a reduction gearing unit 35 which cooperates with a pinion 36 on the shaft 22 to rotate a timer cam 37.

In order to control the positioning of the rotor 10 with respect to the poles 11 and 12 so that when these poles are energized the rotor will be started, there is provided an interrupter unit 38 embodying a permanent magnet 39 which is positioned to attract one of the poles 18, 19, 20 or 21.

Figure 4:
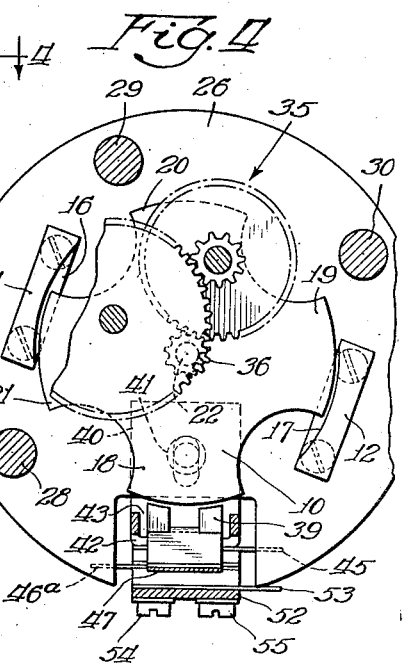
Fig. 4 is a sectional view taken on the line 4—4 of Fig. 3.

It will be noted from Figs. 3 and 4 that the interrupter unit is carried by a bracket 40 which is mounted for movement radially toward and away from the rotor 10 by means of screws 41 upon the plate 26. The bracket 40 carries a strip 42 which is cut out as shown at 43 to permit passage of the magnet 39. The strip 42 at its upper end carries an adjustable stationary contact 44. A terminal plate 45 is provided in contact with the lower end of the strip 42 for electrical connection.

Spaced from the terminal plate 45 and insulated therefrom is a spring strip 46 to which is riveted or otherwise mounted a supporting arm 47 for the permanent magnet 39. This supporting arm also has a movable contact portion 48 having contacts 49 and 50. The contact 50 is adapted to engage the stationary contact 44 while the contact 49 is adapted to engage another adjustable stationary contact 51 that is carried by a strip 52. The strip 52 is connected to a terminal strip 53. The whole assembly just described is supported from the bracket 40 being clamped thereon by two screws 54 and 55 (see Fig. 2).

The permanent magnet 39 is of a long life material preferably of the stock sold under the trade name Alnico in order to obtain maximum magnetic attraction to the rotor with the least weight. The contacts 49 and 50 and their cooperating contact faces on the adjustable contacts 44 and 51 are preferably made of platinum although tungsten or silver contacts may also be used. It is essential however to have contacts that will stand up without difficulty for a long period of time. The use to which this device is intended to be put requires operation free of contact difficulties for a long period without attention.

Referring now to the control cam 37, this cam is preferably constructed of insulating material and is adapted to engage a roller 56 which is mounted upon an arm 57. The arm 57 is a spring arm and carries a contact 58 preferably of platinum, tungsten or silver at its free end. The arm 57 is supported upon an upstanding ear 59 of the plate 31 and insulated from this ear by a suitable means such as indicated at 60 in Fig. 1. The arm 57 has a wiring terminal 61 extending beyond the fixed end thereof. A contact spring 62 is mounted on an ear 63 of the plate 31 and has a contact 64 like the contact 58 and adapted to engage therewith as shown in Fig. 1.

Referring now to Figs. 6, 7 and 8, there is shown a modified form of the invention wherein the rotor 10' is mounted upon a shaft 22'. The shaft 22' however in this case is journalled in ball bearings 65 and 66 which are carried by two non-magnetic frame plates 67 and 68. The shaft 22' in this form carries a pinion 69 meshing with a large gear 70 which in turn drives a cam 37' which is adapted to perform the same function as the cam 37 in the main form of the invention.

The details of the contact arms 57 and 62 and their associated contacts 58 and 64 are not shown in this form of the invention since they are duplicates of those shown in connection with the main form. These contact arms and contact elements are carried by two brackets 71 and 72 which are mounted on the plate 67.

In this form of the invention the poles 11' and 12' are built up of U-shaped laminations of soft magnetic iron which are mounted upon suitable posts 73, 74 and 75 carried by the plate 68. The rotor 10' has the same number of poles as the rotor 10 and these poles are adapted to cooperate with the poles 11' and 12' to impart rotation to the rotor. A permanent magnet 39', similar in all respects to the magnet 39, is mounted upon a spring arm 47' which in turn is carried by a bracket 76 on the plate 68. The magnet carrying arm has a contact carrying portion 77 projecting beyond the permanent magnet and extending at an angle of about 30 degrees to the plane of the arm 47' which carries the permanent magnet. Two contact supporting arms 78 and 79 support stationary contacts 80 and 81 in parallelism with the arm portion 77. The arms 78 and 79 are supported from plate 67 by suitable supporting means indicated generally by the numeral 82. The details of this mounting 82 are in general similar to those by which the bracket 40 supports the several elements thereon and it is believed unnecessary to further describe them. The contact arm 77 has contacts 83 and 84 thereon cooperating with the stationary contacts 80 and 81.

The reason for setting the contacts at an angle of 30 degrees is to prevent the metal from building up as the contacts are operated and to give to them a slight wiping action. It is obvious that the normal vibration of the arm 47' will cause the contacts 83 and 84 to wipe over their respective stationary contacts a slight amount so that the contacts will always remain bright and clear of worn metal particles.

Figure 5:
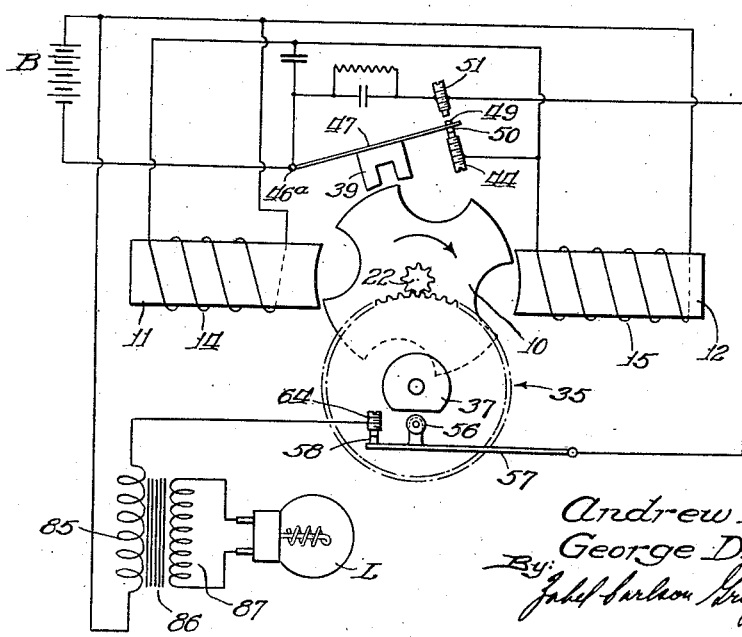
Fig. 5 is a diagrammatic view illustrating the electrical connections of the unit.

Referring now to Fig. 5, the apparatus hereinbefore described is shown diagrammatically with the necessary electrical connections to a source of current comprising a battery B and to a current consumption device comprising a lamp L of the type shown in our patent hereinbefore mentioned. Current is supplied from one side of the battery to the terminal 46a of the spring 46 which in turn carries the arm 47 which supports the permanent magnet 39. The other side of the battery B is connected through the coils 14 and 15 to the terminal 45 and thus to the contact 44 through the strip 42. For sake of clearness in the diagrammatic drawing the contact 44 only is shown as connected to the line from the battery through the coils 14 and 15. With the magnet 39 attracted by the rotor 10 a circuit is closed from one side of the battery through the coils 14 and 15 to the other side of the battery under control of the contacts 44 and 50. The poles 11 and 12 then attract the armature and rotate it in a clockwise direction as shown in Fig. 5 so as to carry it far enough to move the pole of the rotor that formerly was attracted by the magnet 39 substantially out of the field of attraction of the magnet. The inertia of the rotor will of course carry it somewhat beyond the position to align two opposite poles of the rotor between the poles 11 and 12. The spring 46 is therefore free to retract the magnet and does so, separating the contact 50 from the contact 44 and engaging the contact 49 with the contact 51. Separating the contacts 44 and 50 breaks the circuit for the coils 14 and 15. Closing of the contacts 49 and 51, however, completes a circuit which extends from one side of the battery B through the arm 47 and contacts 49 and 51 to the arm 57. The contacts 58 and 64, if in position to close, complete the circuit through a primary coil 85 of a transformer 86, the secondary coil 87 of which is connected across the lamp L.

As the rotor 10 continues to turn it brings another pole in position to be attracted by the magnet 39 and this causes the arm 47 to break the contacts 49, 51 and close the contacts 44, 50. The result is that the coils 14 and 15 are again energized and the circuit of the primary coil 85 is opened. The arm 47 thus functions to successively energize the coils 14 and 15 and to interrupt the current through the primary coil 85 so as to set up an alternating current in the secondary coil 87.

When the motor is rotated sufficiently to cause the cam 37 to break the contacts 58 and 64 the lamp L will of course be de-energized until such time as the contacts 58 and 64 are again allowed to close. It is possible, by properly timing the opening and closing of the contacts to have the contacts 58 and 64 open at a time when no current is passing through said contact; that is, at a time when the contacts 49 and 51 are separated and the contacts 44 and 50 are closed.

The speed of the motor can be varied depending upon the vibration rate of the arm 47 and its spring 46, the spacing between the contact points and the weight of the magnet attached to the arm 47. The vibration of the arm 47 also exerts a governing action so that the motor speed is maintained fairly constant over a considerable variation in battery voltage. When the arm 47 is vibrating rapidly the contacts 44 and 50 are closed for a shorter period of time thus permitting less current to flow into the field coils 14 and 15 which then exert less electromagnetic attraction, due to their failure to fully saturate the poles 11 and 12. When the voltage becomes lower as the battery becomes exhausted there is not such a great tendency for the rotor to move fast. This permits the permanent magnet to retain the contacts 44 and 50 in closed position longer, thus more nearly approaching saturation of the poles 11 and 12. The device is to this extent somewhat self-regulating as to speed through wide variations of battery voltage and load on the motor. It will be apparent that a load tending to slow down the rotor will have the same effect as less energization due to lower battery voltage.

The wiring diagram shown in Fig. 5 is merely one example of the way in which a transformer 86 may be energized from a battery B which is also operating the motor. It will be noted that the current drain on the battery is not continuous but is only during those periods when contact is completed either through the contacts 50 and 44 or through the contacts 49 and 51. The life of the battery may thus be lengthened by maintaining the periods of contact as low as possible for successful operation.

The timing of the flashing of the lamp L by the cam 37 may of course be varied over a wide range merely by utilizing cams of different contour.

From the foregoing description it is believed that the construction and operation of the present invention will be readily apparent to those skilled in this art.

Having thus described our invention, what we claim as new and desire to secure by Letters Patent is:

1. An apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, and a stationary contact serving to limit the approach of the magnet to the rotor.

2. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, and a stationary contact serving to limit the approach of the magnet to the rotor, said rotor having a supporting shaft and a bearing for said shaft comprising a receptacle suspended from a point adjacent said rotor and having a ball on which the end of the shaft rests.

3. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, a stationary contact serving to limit the approach of the magnet to the rotor, and means for moving the stationary contact.

4. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, a stationary contact positioned to engage the arm contact when the magnet is attracted, said arm being movable radially of the rotor when the magnet is attracted by a rotor pole.

5. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a magnet supported by said arm in position to attract a pole of the rotor and pull the rotor into position to be started by the field poles upon energization of the field, and circuit control means operable by movement of said arm in response to the attraction between the magnet and a rotor pole to close an energizing circuit for said field when the pole is closest to the magnet, said arm being movable radially of the rotor in response to the magnet-rotor attraction for each other.

6. Apparatus of the character described comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a permanent magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, a stationary contact serving to limit the approach of the magnet to the rotor, said arm and stationary contact being movable together radially of the rotor to vary the distance of the permanent magnet from the rotor.

7. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a permanent magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, and a stationary contact serving to limit the approach of the magnet to the rotor, said contacts being set at an angle to the direction of movement of the arm to create a wiping action of the contacts.

8. Apparatus of the character described, comprising the combination with a motor structure having a rotor and a field provided with cooperating poles, of means to intermittently energize the field from a direct current source and to provide self-regulation of the motor as to speed over a wide range of voltage for said source, said means comprising a spring mounted arm, a permanent magnet supported by said arm in position to attract a pole of the rotor and pull the rotor into position to be started by the field poles upon energization of the field, said arm also carrying a circuit closing contact adapted to move into engagement with a stationary contact and close the circuit for said field when the magnet is attracted by a rotor pole, a stationary contact serving to limit the approach of the magnet to the rotor, said contacts being set at an angle to the direction of movement of the arm to create a wiping action of the contacts, and means to shift said arm radially of the rotor.

ANDREW F. HENNINGER.
GEORGE D. HENNINGER.